(12) United States Patent
Maeyama et al.

(10) Patent No.: US 9,302,680 B2
(45) Date of Patent: Apr. 5, 2016

(54) TRANSPORTATION SYSTEM

(71) Applicant: MITSUBISHI HEAVY INDUSTRIES, LTD., Tokyo (JP)

(72) Inventors: Hiroyuki Maeyama, Tokyo (JP); Toru Kanemori, Tokyo (JP); Mitsuaki Hoshi, Tokyo (JP); Takahiro Suzuki, Tokyo (JP); Masahisa Masukawa, Tokyo (JP); Toshiaki Asanoma, Tokyo (JP); Kousuke Katahira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1 day.

(21) Appl. No.: 14/354,665

(22) PCT Filed: Nov. 9, 2012

(86) PCT No.: PCT/JP2012/079188
§ 371 (c)(1),
(2) Date: Apr. 28, 2014

(87) PCT Pub. No.: WO2013/094336
PCT Pub. Date: Jun. 27, 2013

(65) Prior Publication Data
US 2014/0290525 A1    Oct. 2, 2014

(30) Foreign Application Priority Data
Dec. 19, 2011    (JP) .................... 2011-277509

(51) Int. Cl.
*B60L 5/00* (2006.01)
*B61B 13/00* (2006.01)
(Continued)

(52) U.S. Cl.
CPC . *B61B 13/00* (2013.01); *B60L 5/36* (2013.01); *B61B 13/04* (2013.01); *E01B 25/28* (2013.01); *B60L 2200/26* (2013.01)

(58) Field of Classification Search
CPC ......... B61B 13/00; B61B 13/04; B60L 15/36; B60L 2200/26; E01B 25/28
See application file for complete search history.

(56) References Cited

U.S. PATENT DOCUMENTS 4,265,180 A * 5/1981 Uozumi ..................... 104/247
6,477,963 B1 * 11/2002 Weule et al. ................ 104/243
(Continued)

FOREIGN PATENT DOCUMENTS

CN    101472776    7/2009
EP    0 990 576    4/2000
(Continued)

OTHER PUBLICATIONS

Singapore Office Action issued Mar. 27, 2015 in corresponding Singapore Patent Application No. 11201401910U with English translation.
(Continued)

*Primary Examiner* — Jason C Smith
(74) *Attorney, Agent, or Firm* — Wenderoth, Lind & Ponack, L.L.P.

(57) ABSTRACT

A transportation system includes a vehicle, a track having a traveling road surface on which the vehicle travels and guide parts which extend to both sides in a width direction of the traveling road surface. The track has a first section in which the vehicle is guided by the guide parts and travels on the track, and a second section in which the vehicle travels on the track by steering of the vehicle.

9 Claims, 12 Drawing Sheets

(51) Int. Cl.
*E01B 25/28* (2006.01)
*B60L 5/36* (2006.01)
*B61B 13/04* (2006.01)

(56) References Cited

U.S. PATENT DOCUMENTS

| | | | |
|---|---|---|---|
| 7,644,664 B2 * | 1/2010 | Nakao et al. | 104/243 |
| 9,061,690 B2 * | 6/2015 | Kanemori et al. | |
| 2005/0139117 A1 * | 6/2005 | Ralph et al. | 105/168 |
| 2008/0083345 A1 * | 4/2008 | Morita et al. | 104/106 |
| 2012/0000391 A1 * | 1/2012 | Maeyama et al. | 105/182.1 |
| 2012/0097065 A1 * | 4/2012 | Maeyama et al. | 105/177 |
| 2012/0103227 A1 * | 5/2012 | Maeyama et al. | 104/245 |
| 2012/0168525 A1 * | 7/2012 | Kono et al. | 238/17 |
| 2013/0125780 A1 * | 5/2013 | Maeyama et al. | 104/306 |
| 2013/0193277 A1 * | 8/2013 | Kawauchi et al. | 246/415 R |
| 2013/0193278 A1 * | 8/2013 | Yanobu et al. | 246/415 R |
| 2014/0190366 A1 * | 7/2014 | Mukai et al. | 104/130.01 |
| 2014/0290525 A1 * | 10/2014 | Maeyama et al. | 104/242 |

FOREIGN PATENT DOCUMENTS

| | | |
|---|---|---|
| JP | 02-194407 | 8/1990 |
| JP | 07-081552 | 3/1995 |
| JP | 11-278004 | 10/1999 |
| JP | 2000-132230 | 5/2000 |
| JP | 2000-172336 | 6/2000 |
| JP | 2000-172338 | 6/2000 |
| JP | 2000-339031 | 12/2000 |
| JP | 2002-19603 | 1/2002 |
| JP | 2002-351544 | 12/2002 |
| JP | 2006-175962 | 7/2006 |
| JP | 2006-205945 | 8/2006 |
| JP | 2006-306334 | 11/2006 |
| JP | 2008-068829 | 3/2008 |
| JP | 2009-23509 | 2/2009 |
| JP | 2010-188971 | 9/2010 |
| JP | 2010-195057 | 9/2010 |
| JP | 2010-195175 | 9/2010 |
| JP | 2011-127290 | 6/2011 |
| WO | 2004/040391 | 5/2004 |
| WO | 2009/011142 | 1/2009 |
| WO | 2011/074146 | 6/2011 |

OTHER PUBLICATIONS

Japanese Decision of Rejection issued Oct. 21, 2014 in corresponding Japanese Application No. 2011-277509 with English translation.
International Search Report issued Feb. 12, 2013 in International (PCT) Application No. PCT/JP2012/079188 with English translation.
Written Opinion of the International Searching Authority issued Feb. 12, 2013 in International (PCT) Application No. PCT/JP2012/079188 with English translation.
Singapore Office Action issued Apr. 7, 2015 in corresponding Singapore Patent Application No. 11201401910U with English translation.
Chinese Office Action issued Aug. 31, 2015 in Chinese Application No. 201280053375.3 (with English translation of Search Report).

* cited by examiner

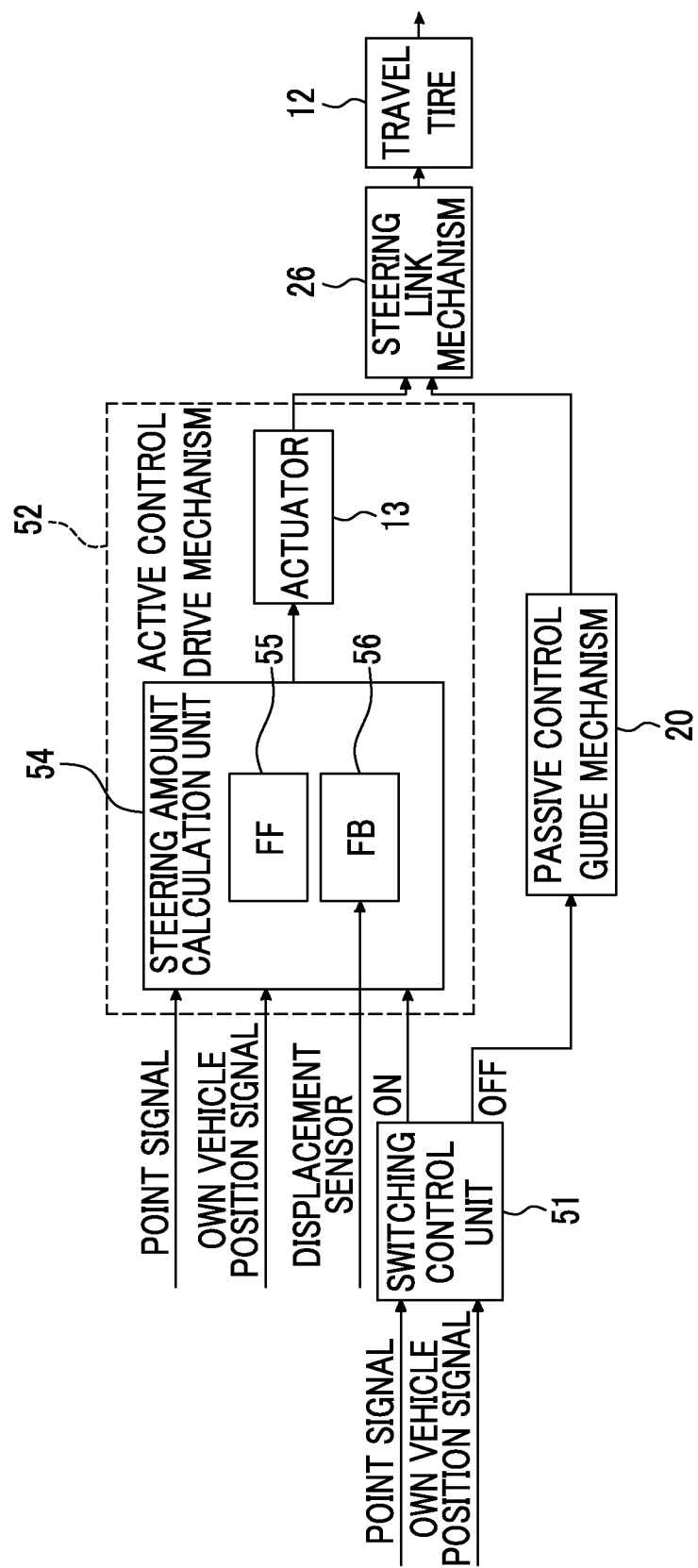

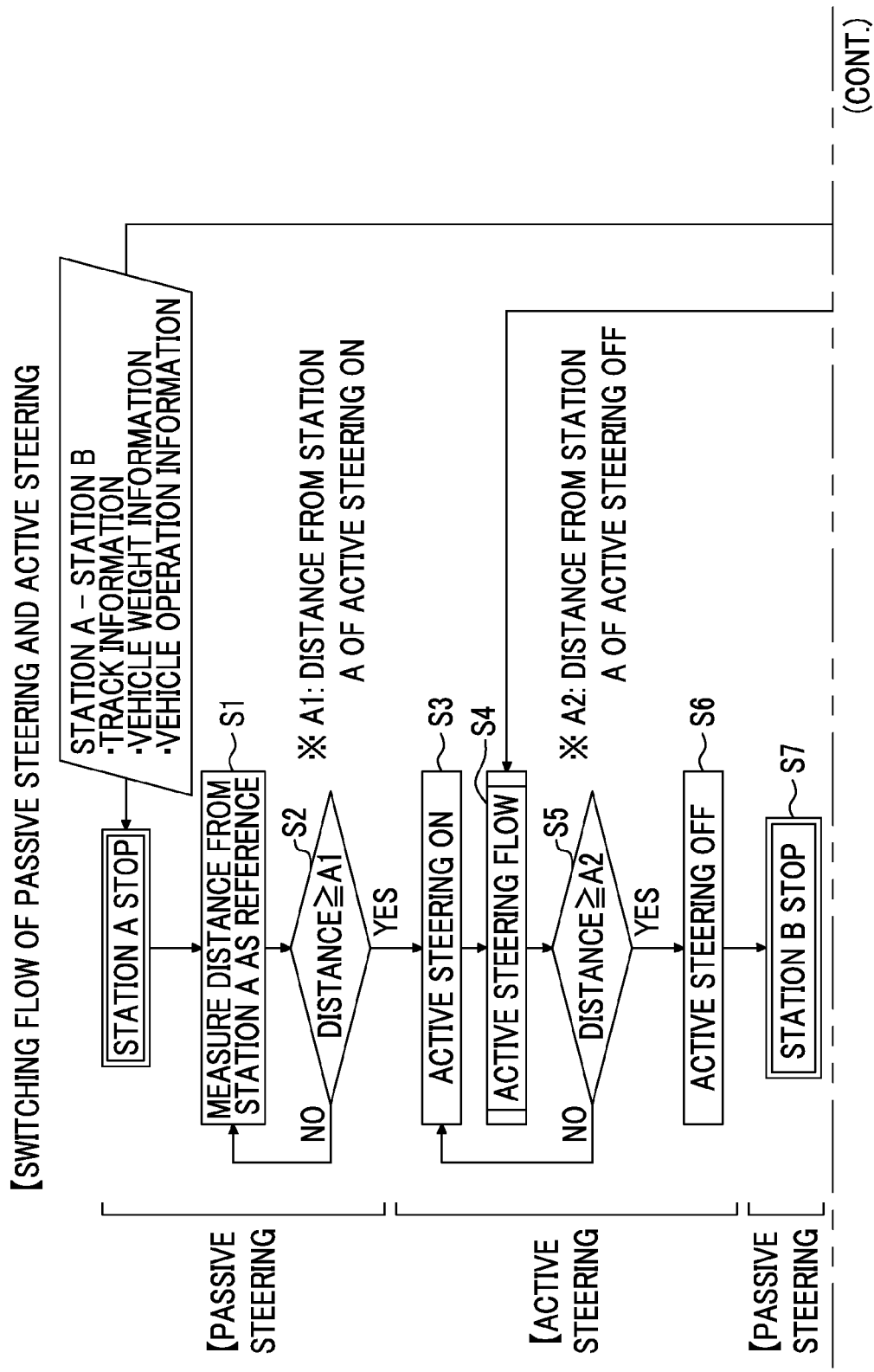

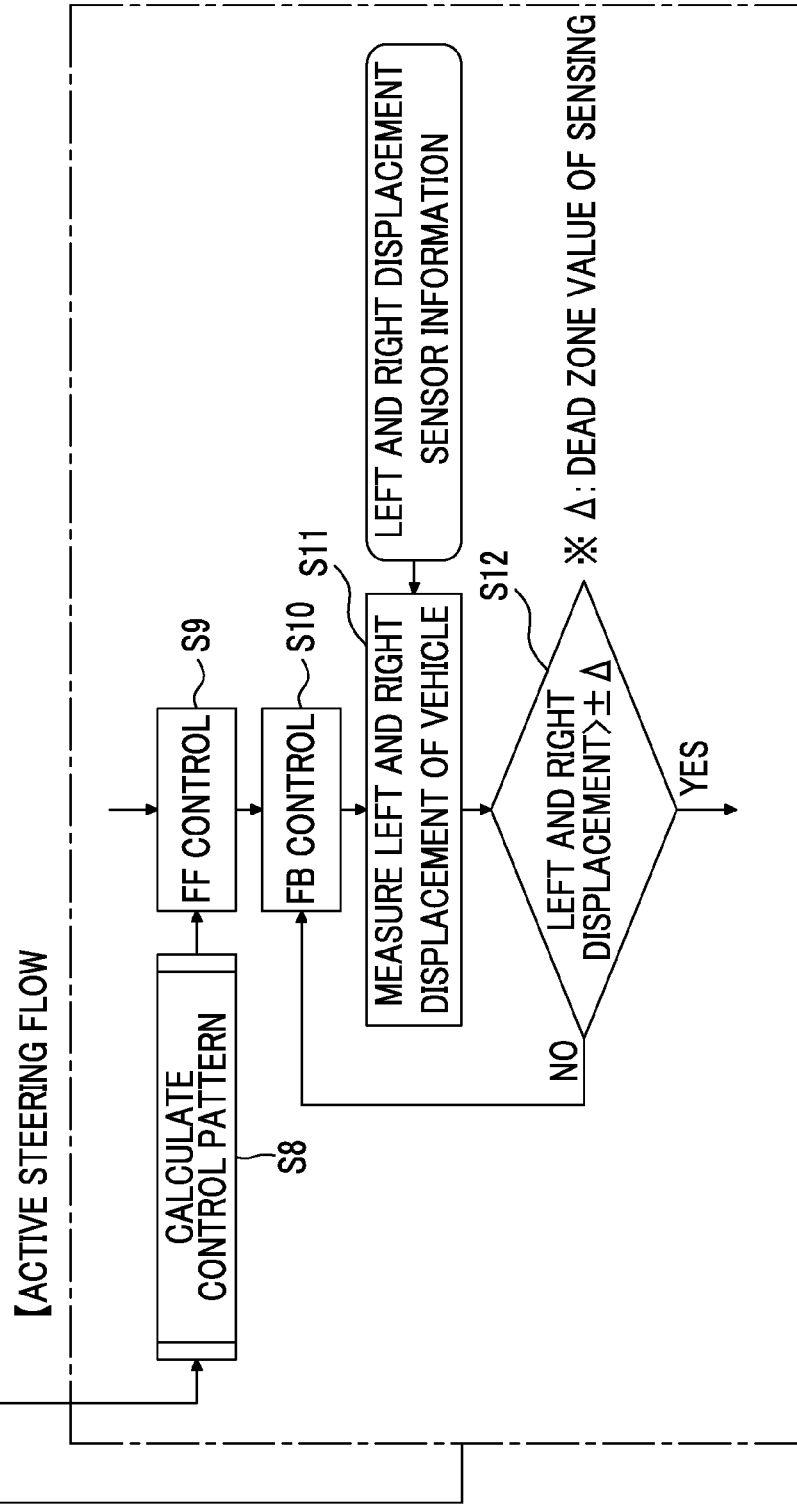

TRANSPORTATION SYSTEM

BACKGROUND OF INVENTION

Technical Field

The present invention relates to a transportation system including a vehicle and a track having a traveling road surface, on which the vehicle travels, and guide parts which extend on both sides in a width direction of the traveling road surface.

This application claims priority based on Japanese Patent Application No. 2011-277509, filed Dec. 19, 2011, the content of which is incorporated herein by reference.

BACKGROUND ART

As new traffic means other than a bus or a train, a track transportation system is known in which a vehicle travels on a track with running wheels having rubber tires and guide wheels provided in both lateral portions of the vehicle are guided by guide rails provided in both lateral portions of the track. This track transportation system is generally called a new transportation system or an APM (Automated People Mover).

The above-described track transportation system becomes a double line in which two main tracks are arranged in order to allow a vehicle to travel in two different directions simultaneously, and in some sections, a transfer traveling road surface which allows the vehicle to be delivered between the two main tracks is provided.

In this type of new transportation system, as a steering system, a side guide system and a center guide system are known. These steering systems are a so-called passive control steering system in which the guide wheels follow the guide rails and the vehicle is guided. Of these, the side guide system causes the guide wheels attached to both sides of the vehicle to follow the guide rails provided on both sides of the track, thereby steering the vehicle. In the side guide system, a gap is provided between the guide rails and the guide wheels, and one of the guide wheels on both sides of the vehicle is constantly in contact with the guide rail (see PTL 1).

Similarly to the railroad rails, a plurality of guide rails are continuously arranged in the travel direction, and a predetermined gap is provided between the guide rail and the guide rail taking into consideration the influence of seasonal differences in temperature.

CITATION LIST

Patent Literature

PTL 1: Japanese Unexamined Patent Application Publication No. 2011-127290

Technical Problem

However, in the transportation system of the related art, since one of the guide wheels is constantly in contact with the guide rail, the guide rails are bent and a step is generated between the continuous guide rails due to precision failure of the guide rails. For this reason, there is a problem in that vibration in the left-right direction occurs during traveling of the vehicle, and riding quality of the vehicle is deteriorated. Accordingly, when laying the guide rails, although adjustment is performed whenever possible to improve riding quality of the vehicle, there is a problem in that a lot of time is required for adjustment, and cost at the time of laying increases.

In order to improve precision of the guide rails, a method which increases rigidity of the guide rails is known; however, in this case, the weight of the guide rails increases, and it is not desirable in terms of transportation cost or installation cost.

Since the guide wheels which are guided by the guide rails constantly bear the guide load, service lifetime is short, causing an increase in cost. In particular, when the vehicle swings left and right during high-speed driving, if the stopped guide wheels come into contact with the guide rails, the guide wheels are simultaneously rotated at high speed, and thus a heavy burden is imposed on the guide wheel.

SUMMARY OF INVENTION

The invention has been accomplished in consideration of this situation, and an object of the invention is to provide a transportation system which allows a vehicle to travel with excellent riding quality.

Solution to Problem

In order to attain the above-described object, the invention provides the following means.

A transportation system of the invention includes a vehicle, and a track having a traveling road surface on which the vehicle travels and guide parts which extend on both sides in a width direction of the traveling road surface, in which the track has a first section in which the vehicle is guided by the guide part and travels on the track, and a second section in which the vehicle travels on the track by the steering of the vehicle.

According to the above-described configuration, since the vehicle travels on the track in the second section without being guided by the guide parts, it is possible to allow the vehicle to travel without depending on the state of the guide parts. Accordingly, of the entire track on which the vehicle travels, a section in which the vehicle comes into contact with the guide parts and vibrates left and right is shortened, thereby improving riding quality.

In the transportation system of the invention, the vehicle may have a vehicle body, running wheels which are attached to a lower portion of the vehicle body, a steering mechanism which is able to steer the directions of the running wheel with respect to the vehicle body, a drive mechanism which includes an actuator and operates the steering mechanism by the driving of the actuator to steer the direction of the running wheels, and a guide mechanism which includes guided parts provided on both sides in the width direction of the vehicle body and guided by the guide parts, and causes the steering mechanism to steer the direction of the running wheels in accordance with the positions in the width direction of the guided parts.

According to the above-described configuration, it is possible to steer the direction of the running wheel without using the guide parts by the drive mechanism. Accordingly, since it is possible to allow the vehicle to travel without depending on the state of the guide parts, the vehicle can travel with excellent riding quality without vibrating left and right. On the other hand, the positions in the width direction of the guided parts of the guide mechanism are set by the guidance of the guide part, whereby it is possible to accurately steer the direction of the running wheels to perform positional adjustment.

The above-described transportation system may further include a steering control switching control unit which controls the driving of the drive mechanism in the second section, which is set in advance in the track and in which the steering mechanism is controlled by the drive mechanism, and stops the driving by the drive mechanism in the first section, which is set in advance in the track and in which the steering mechanism is controlled by the guide mechanism.

According to the above-described embodiment, the drive mechanism and the guide mechanism are switched using the switching control unit, making it possible to control the steering mechanism in conformity with the sections.

In the above-described transportation system, the guide mechanism of the vehicle may have an auxiliary guided part which allows the steering mechanism to adjust the direction of the running wheels in accordance with the positions in the width direction, and the track may be provided such that the guide parts are at a distance equal to or greater than a preset gap from the guided parts of the vehicle, and may have an auxiliary guide part which guides the auxiliary guided part, and a gap between the auxiliary guide part and the auxiliary guided part may be set to be smaller than the gap between the guide parts and the guided parts.

According to the above-described embodiment, since the gap between the auxiliary guide part and the auxiliary guided part is set to be smaller than the gap between the guide parts and the guided parts, the vehicle can be guided by the auxiliary guide part and the auxiliary guided part in the first section.

In the above-described transportation system, the distance between the guided parts may be changeable.

According to the above-described embodiment, the drive mechanism is operated while keeping the guided parts away from the guide parts in the second section, thereby suppressing left/right vibration of the vehicle. Furthermore, the vehicle can be guided while bringing the guided parts into contact with the guide parts in the first section. That is, similarly to the existing transportation system, since the guidance is performed using the guide parts and the guided parts even in the first section, the guide parts and the auxiliary guide part of the transportation system can be used as the guide parts and the auxiliary guide part of the existing transportation system.

In the above-described transportation system, the distance between the guide parts may differ in the first section and the second section.

According to the above-described embodiment, the distance between the guide parts can be set such that the guided parts and the guide parts are away from each other in the second section, and can be set such that the vehicle is guided by the guided parts and the guide parts in the first section. Accordingly, the vehicle can be guided while bringing the guided parts into contact with the guide parts even in the first section without changing the distance between the guided parts on the vehicle side.

Advantageous Effects of Invention

According to the invention, it is possible to steer the direction of the running wheels without using the guide parts by the drive mechanism. With this, since it is possible to allow the vehicle to travel without depending on the state of the guide parts, it is possible to provide a transportation system with excellent riding quality without causing left/right vibration of the vehicle.

BRIEF DESCRIPTION OF DRAWINGS

FIG. 8 is a diagram showing a control system according to the first embodiment.

FIG. 9 is a flowchart showing a switching flow of passive control steering and active control steering according to the first embodiment.

DESCRIPTION OF EMBODIMENTS

First Embodiment

A transportation system according to a first embodiment of the invention will be described.

Figure 1:
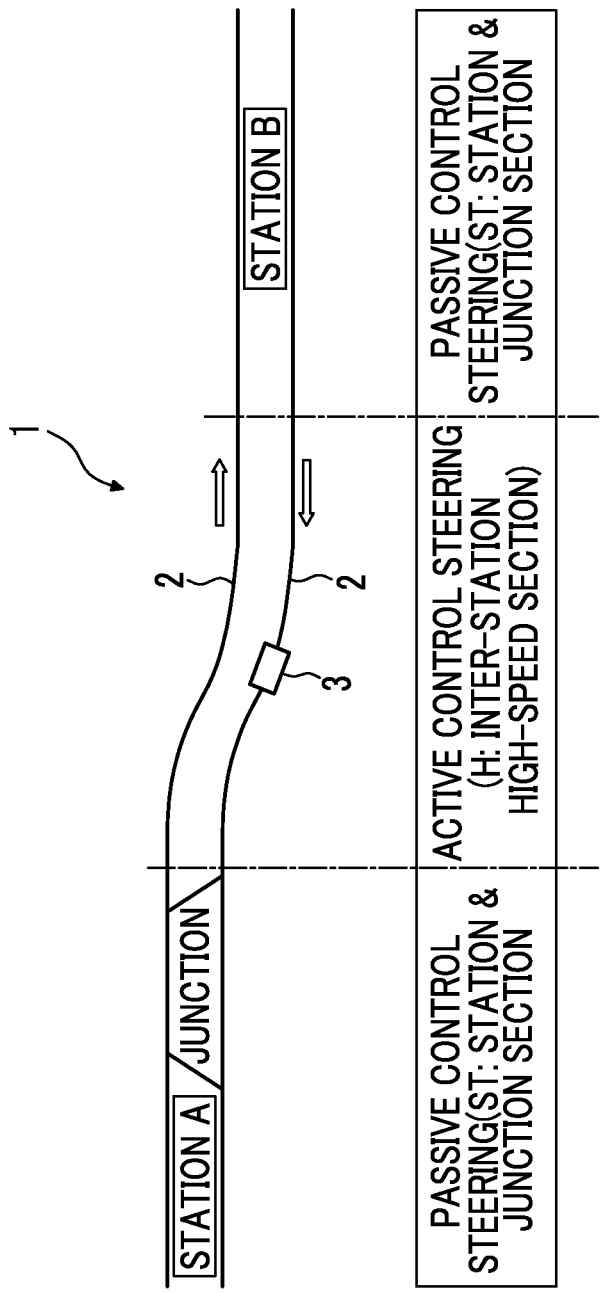
FIG. 1 is a schematic view of a route according to an embodiment of the invention.

As shown in FIG. 1, a transportation system 1 of this embodiment uses a track-based vehicle 3 which travels on a predefined track 2. The track 2 is laid along a route which connects a station A and a station B, and is provided in an up route and a down route. A junction is provided between the station A and the station B, and the track-based vehicle 3 can switch between the up route and the down route as necessary.

In the route of this embodiment, a station & junction section ST and an inter-station high-speed section H are set in advance in the track 2. The station & junction section ST is a section in which the track-based vehicle 3 travels at low speed, and the track-based vehicle 3 is guided by guide rails 5 described below. In the inter-station high-speed section H, the track-based vehicle 3 is set so as to move at higher speed than in the station & junction section ST.

The transportation system 1 of this embodiment is a system which guides the track-based vehicle 3 by the guide rails 5 in the station & junction section ST, and allows the track-based vehicle 3 to travel on the track 2 by running wheel steering in the inter-station high-speed section H.

In the inter-station high-speed section H, the track-based vehicle 3 is not necessarily moved at high speed, and the track-based vehicle 3 may be allowed to travel at the same speed as in the station & junction section ST.

Figure 2:
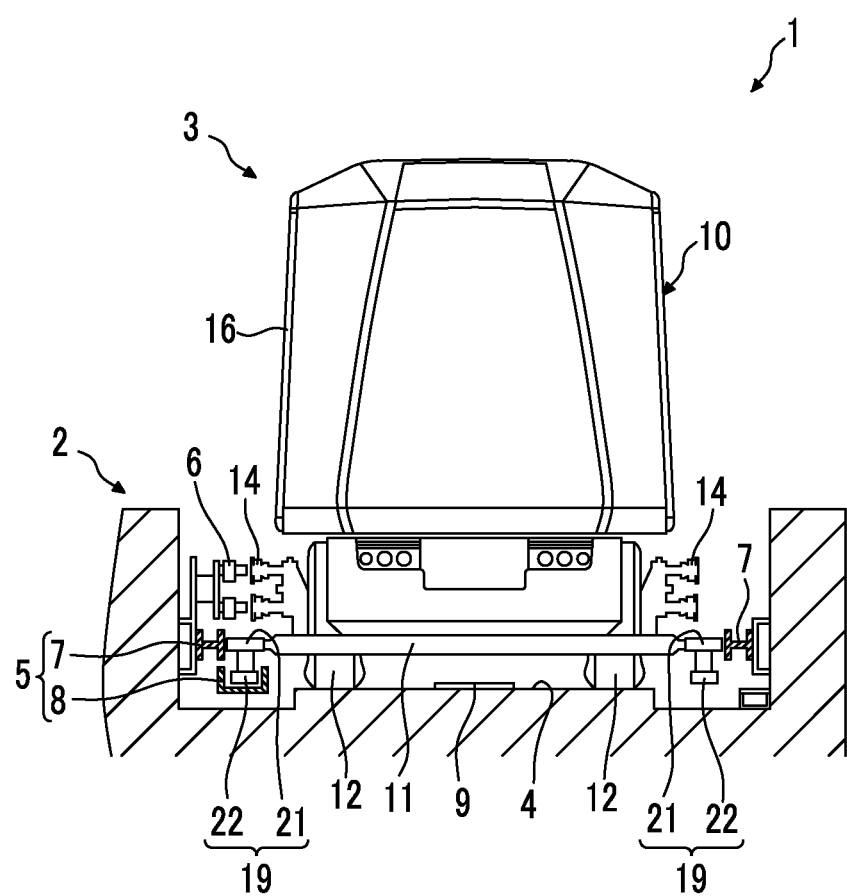
FIG. 2 is a front view of a transportation system according to a first embodiment of the invention.

As shown in FIG. 2, as the guidance system of the track-based vehicle 3, a so-called side guide system using the guide rails 5 having main guide rails 7 and junction guide rails 8 is introduced.

The transportation system 1 of this embodiment is a system which is constructed using the existing main guide rails 7. That is, when the transportation system 1 of this embodiment is applied to the existing transportation system, the existing main guide rails 7 can be used as they are.

The track 2 of the transportation system 1 has a traveling road surface 4 on which the track-based vehicle 3 travels, the guide rails 5 which extend on both sides in the width direction of the track-based vehicle 3, and trolley wires 6 which extend on both sides in the width direction of the traveling road surface 4.

As described above, the guide rails 5 have the main guide rails 7 which are arranged on both sides of the traveling road surface 4, and the junction guide rails 8 which are provided in a junction part where the traveling road surface 4 branches off and a station part. The junction guide rails 8 are provided below the main guide rails 7 so as to avoid interference with the main guide rails 7. In the traveling road surface 4, a plurality of ground elements 9 which store and send information necessary for the driving of the track-based vehicle 3 over the full length of the track 2 are provided.

Next, the details of the track-based vehicle 3 will be described.

Figure 3:
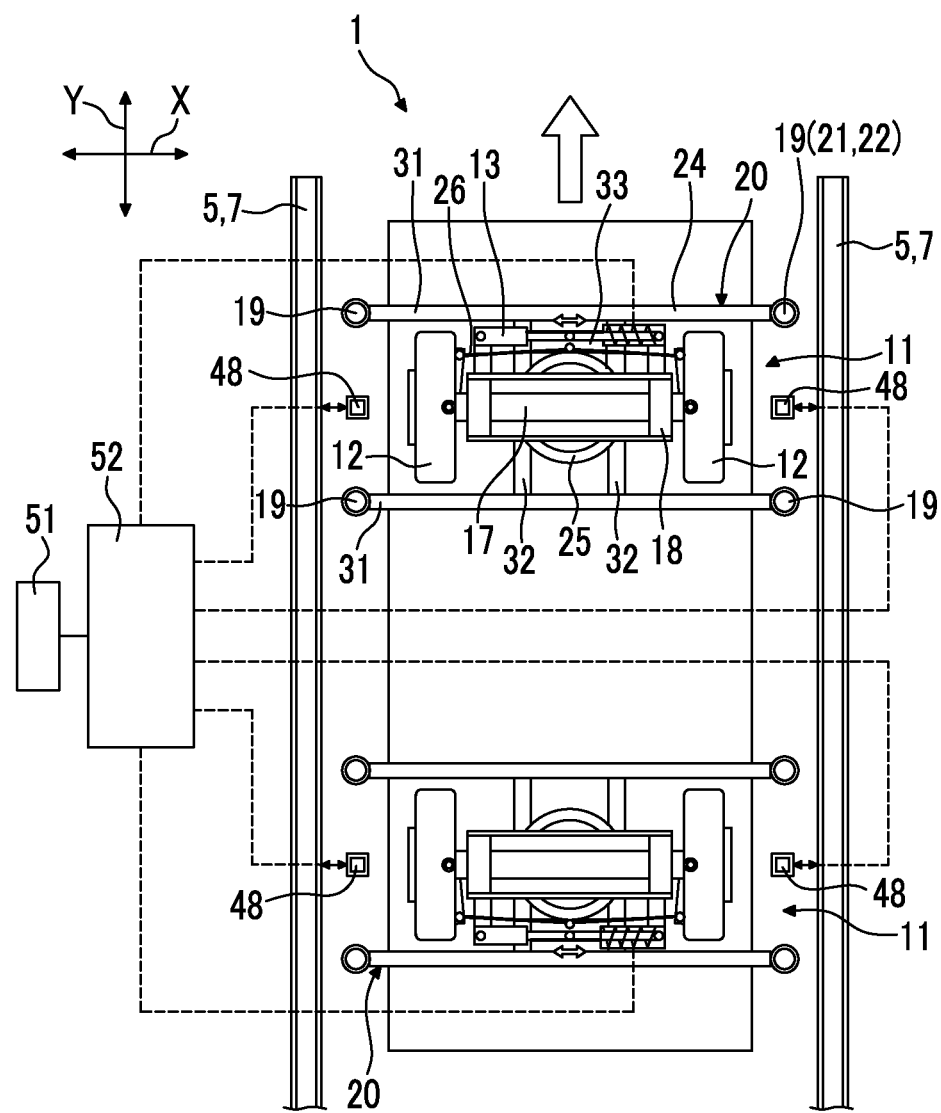
FIG. 3 is a plan view showing a travel device of the transportation system according to the first embodiment.
Figure 4:
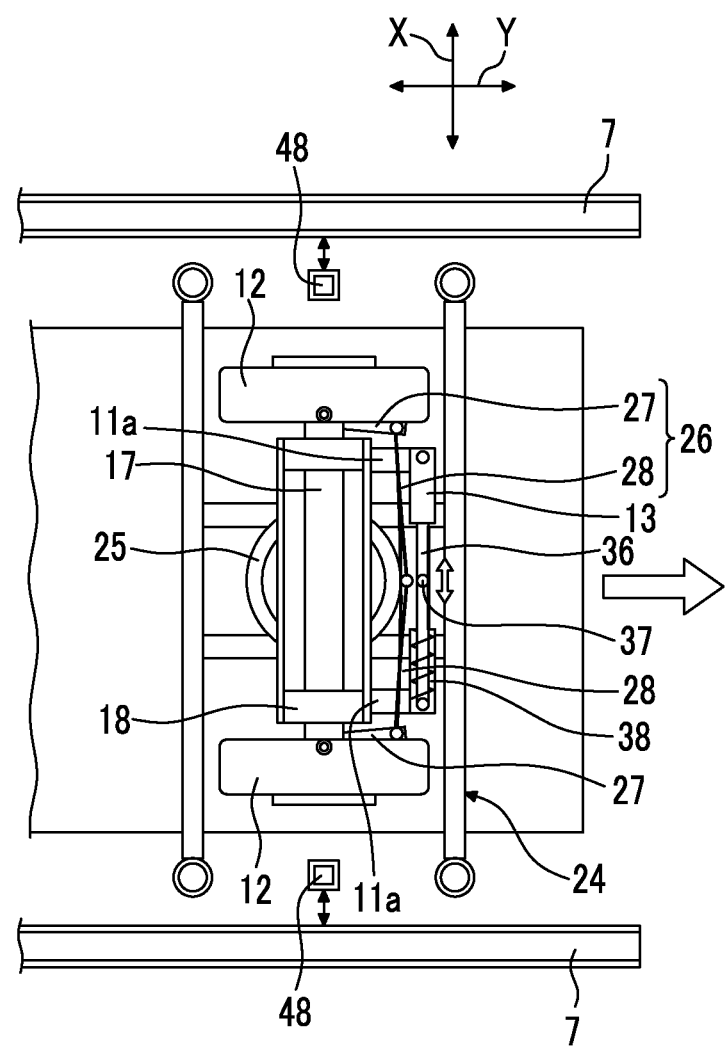
FIG. 4 is a plan view showing a main part of the travel device.
Figure 5:
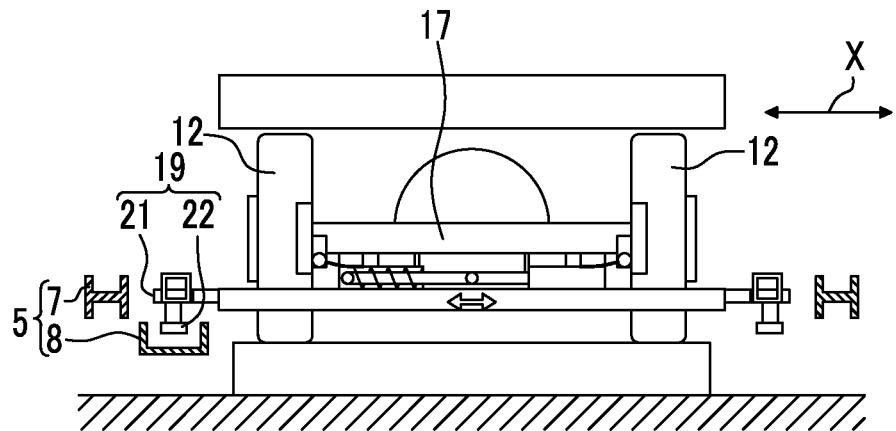
FIG. 5 is a front view showing a main part of the travel device.

As shown in FIGS. 2, 3, and 4, the track-based vehicle 3 includes a vehicle body 10, two travel devices 11 which support the vehicle body 10 on the front and back sides in the forth-back direction Y of the vehicle, actuators 13 which change the angle in the travel direction of the running tires 12, and power collection devices 14 which are arranged on both sides in the width direction X of the track-based vehicle 3. The vehicle body 10 has a rectangular parallelepiped vehicle body 16 on the travel devices 11. The power collection devices 14 bring an electric motor (not shown) rotating the running tires 12 into contact with the trolley wires 6 of the track 2, thereby supplying power to the electric motor.

The track-based vehicle 3 has an active control drive mechanism 52 which actively steers the track-based vehicle 3 using the actuators 13. The track-based vehicle 3 has a switching control unit 51 which performs switching to operate or stop the active control drive mechanism 52 in accordance with the position of the track-based vehicle 3.

Next, the travel device 11 on the front side of the track-based vehicle 3 will be described. The travel device 11 on the back side has the same configuration as the travel device 11 on the front side.

The travel device 11 includes a pair of left and right running tires 12, an axle 17 which connects a pair of running tires 12, a suspension device 18 which supports the axle 17 and a pair of running tires 12, guide wheels 19, and passive control guide mechanisms 20 which steer the running tires 12.

Hereinafter, in regard to the track-based vehicle 3, when "up-down direction", "forth-back direction", and "left-right direction (vehicle width direction)" are simply described with no otherwise specified, it is assumed that these directions represent the directions based on the vehicle body 10 when the track-based vehicle 3 is located on the straight traveling road surface 4.

That is, "up-down direction" means a direction perpendicular to the guide rails 5 in a section orthogonal to the extension direction of the guide rails 5, "forth-back direction" means the extension direction of the guide rails 5, and "left-right direction" means the width direction of the track-based vehicle 3.

The guide wheels 19 have main guide wheels 21 which roll in contact with the above-described main guide rails 7, and junction guide wheels 22 which roll in contact with the above-described junction guide rails 8. The junction guide wheels 22 in contact with the junction guide rails 8 are provided below the main guide wheels 21 in contact with the main guide rails 7.

The guide wheels 19 having the main guide wheels 21 and the junction guide wheels 22 are provided on both left and right sides of the vehicle body 10. The main guide rails 7 are positioned outside the main guide wheels 21 in the width direction X of the traveling road surface 4, and the junction guide rails 8 are positioned inside the junction guide wheels 22 in the width direction X of the traveling road surface 4. In the main guide wheels 21 and the junction guide wheels 22, the outer circumferential portions thereof are formed of an elastic body, for example, urethane rubber or the like.

Each of the passive control guide mechanisms 20 has a support frame 24 which rollably supports the guide wheels 19 on the front and back sides and at both ends in the width direction X, a turning bearing 25 which turnably supports the support frame 24 around a turning axis perpendicular to the floor of the vehicle body 10, and steering link mechanisms 26 which steer the running tires 12 with the turning of the support frame 24.

The support frame 24 has a pair of front and back first horizontal beams 31 which extend in the width direction X and are arranged front and back centered around the axle 17, a pair of left and right vertical beams 32 which extend in the forth-back direction Y and connect a pair of front and back first horizontal beams 31, and a second horizontal beam 33 which extends in the width direction X so as to connect a pair of vertical beams 32. The second horizontal beam 33 is arranged so as to follow the front and back first horizontal beams 31 at a distance from the center of the support frame 24 in the forth-back direction Y.

In the turning bearing 25, one of the outer ring and the inner ring of the turning bearing 25 is fixed to the support frame 24, and the other ring is fixed to the suspension device 18. Each of the steering link mechanisms 26 has a steering arm 27 which pivots integrally with the running tire 12 based on the kingpin (not shown) of the running tire 12, and a steering rod 28 which connects the steering arm 27 and the second horizontal beam 33. One end portion of the steering rod 28 is pin-coupled to the end portion of the steering arm 27, and the other end portion is pin-coupled to the central portion of the second horizontal beam 33.

The actuator 13 is a hydraulic cylinder having a movable rod 36, and the cylinder part of the actuator 13 is attached to a predetermined frame 11a of the travel device 11 such that the expandable direction of the movable rod 36 follows the left-right direction. The end portion of the movable rod 36 is pin-coupled to the central portion of the second horizontal beam 33 of the support frame 24 through a connecting pin 37. A specific structure of the actuator 13 will be described below.

A straight restoring spring 38 is attached to the side of the movable rod 36 opposite to the actuator 13 in the left-right direction. The straight restoring spring 38 has one end which is pin-coupled to the connecting pin 37, and the other end which is attached to the predetermined frame 11a of the travel device 11 such that the straight restoring spring 38 follows the left-right direction. The straight restoring spring 38 provides a restoring force to the connecting pin 37 such that the running tires 12 are constantly directed in the straight direction.

Displacement sensors 48 are attached to the left and right sides of the travel device 11. The displacement sensors 48 are sensors for measuring the distance between the main guide wheels 21 and the main guide rails 7, and for example, laser sensors, eddy current sensors, or the like may be used.

The two displacement sensors 48 are attached to both lateral portions of each of the travel devices 11, that is, the four displacement sensors 48 are attached to one track-based vehicle 3. The position of each of the displacement sensors 48 in the forth-back direction Y is the central portion of the travel device 11 in the forth-back direction Y. The displacement sensors 48 are attached to the support frame 24 of the travel device 11 by a predetermined method. The displacement sensors 48 are attached substantially at the same height as the main guide wheels 21. That is, the displacement sensors 48 are attached substantially at the same height as the main guide rails 7.

A signal from each of the displacement sensors 48 is used as an input signal when the steering link mechanisms 26 are operated by active control steering described below.

Next, a hydraulic circuit 40 for operating the actuator 13 will be described.

Figure 6:
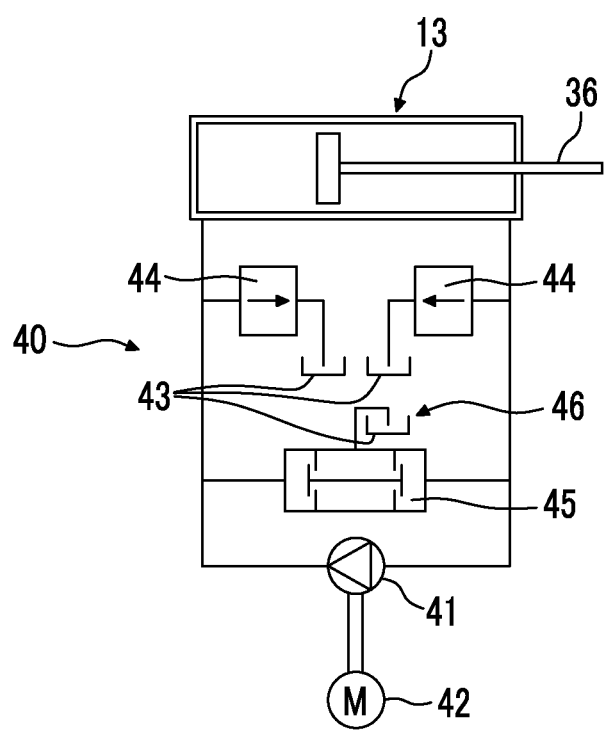
FIG. 6 is a schematic view illustrating a hydraulic circuit for operating an actuator according to the first embodiment.

As shown in FIG. 6, the hydraulic circuit 40 of the hydraulic cylinder constituting the actuator 13 is a closed circuit having a gear pump 41 which supplies hydraulic oil to the hydraulic cylinder, a motor 42 which drives the gear pump 41, storage tanks 43 of hydraulic oil, and a relief valve 44 which is closed when a load equal to or greater than an allowable value is applied to the hydraulic circuit and allows the hydraulic oil to escape to the storage tanks 43. Since the actuator 13 is a single rod cylinder, in order to compensate for a difference in volume for the cylinder rod, a compensation circuit 46 having a micro-shuttle valve 45 and the storage tanks 43 is provided on the ejection side of the gear pump 41.

The steering link mechanism 26 can steer the running tire 12 by two methods. The first method is passive control steering which is a steering method by passive operation. The second method is active control steering which is a steering method by active operation. These steering methods can be switched by the switching control unit 51.

First, the action of the passive control steering will be described.

If the main guide wheels 21 of the track-based vehicle 3 come into contact with the main guide rails 7, and receive a force in the vehicle width direction X from the main guide rails 7, the support frame 24 which supports the main guide wheels 21 receives the force in the vehicle width direction X from the main guide wheels and turns around the turning axis. If the support frame 24 turns, the steering rod 28 of the steering link mechanism 26 is displaced with the turning, and the steering arm 27 and the running tire 12 rotate around the kingpin from the displacement. That is, the running tire 12 is steered. When the junction guide wheels 22 of the track-based vehicle 3 come into contact with the junction guide rails 8, and receive the force in the vehicle width direction X from the junction guide rails 8, as described above, the support frame 24 which support the junction guide wheels 22 turns, and the running tire 12 is steered by the turning.

Next, the action of the active control steering will be described.

The active control steering is performed by the operation of the actuator 13. That is, the movable rod 36 of the actuator 13 expands and contracts, whereby the support frame 24 constituting the second horizontal beam turns around the turning axis through the connecting pin 37. As in the passive control steering, the running tire 12 is steered by the turning of the support frame 24. The operation amount of the actuator 13, that is, the steering amount of the steering link mechanism 26 is determined by a steering amount calculation unit 54 described below.

Figure 7:
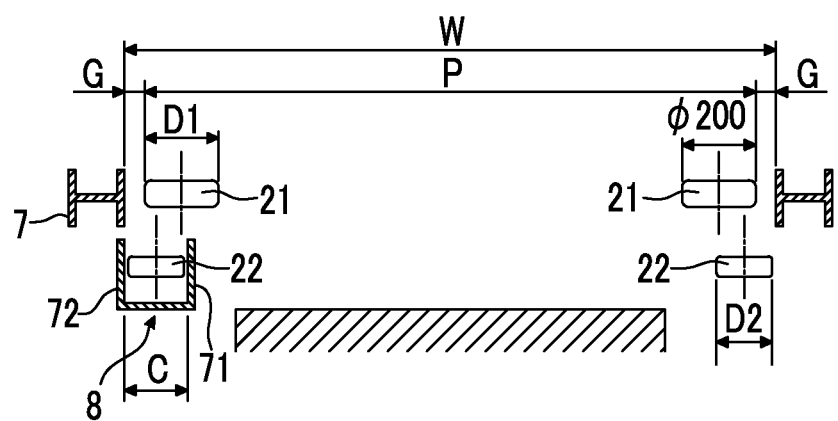
FIG. 7 is a schematic view illustrating the details of guide rails and guide wheels according to the first embodiment.

Next, the details of the main guide rails 7, the junction guide rails 8, and the guide wheels 19 will be described referring to FIG. 7.

The dimension W (hereinafter, referred to as a rail spacing) of the spacing between the guide rails 7 can be substantially the same dimension as the rail spacing in the existing transportation system. The dimension W is, for example, 2,900 mm.

The distance (hereinafter, referred to as an outer width P) between the outer ends in the width direction X of the left and right guide wheels 21 is set to be smaller than the rail spacing W by a predetermined dimension. The outer width P is, for example, 2,800 mm. The dimension of 2,800 mm is a value smaller than the outer width of the track-based vehicle of the existing transportation system by 100 mm. That is, in the existing transportation system, the outer width of the guide wheels is equal to the rail spacing W or is slightly narrower than the rail spacing W. The outer diameter D1 of the guide wheel 21 can be, for example, 200 mm.

In a state where the track-based vehicle 3 is disposed at the center with respect to the left and right main guide rails 7, a gap G is generated between the main guide wheels 21 and the main guide rails 7. For example, if W=2,900 mm and P=2,800 mm, the gap G becomes 50 mm.

The junction guide rails 8 are rails having a U-shaped section for guiding the junction guide wheels 22 in the station & junction section ST. Each of the junction guide rails 8 includes two guide walls which are arranged on both sides in the left-right direction of the junction guide wheel 22, that is, a main guide wall 71 and a sub-guide wall 72. The main guide wall 71 guides the junction guide wheel 22 in the station & junction section ST. The sub-guide wall 72 is provided so as to prevent movement of the junction guide wheel 22 outward in the left-right direction in the station & junction section ST. The inner spacing C between the main guide wall 71 and the sub-guide wall 72 is set to be slightly greater than the outer diameter D2 of the junction guide wheel 22.

Next, the switching control unit 51 and the active control drive mechanism 52 for controlling the track-based vehicle 3 of this embodiment will be described.

As shown in FIG. 8, a point signal and own vehicle position information are input to the switching control unit 51.

The point signal (point information) is positional information which is transmitted from each ground element 9, and refers to a signal which is transmitted from each of a plurality of ground elements 9 with no power source laid at predetermined sections along the track 2 over the full length of the track 2. The transmitted information includes identification number of each ground element 9, positional information, track information, and control information. The positional information includes an absolute position coordinate relating to the ground element 9 or the distance from a reference point.

Own vehicle position information is a signal regarding where the own vehicle is, and refers to information relating to the own vehicle position calculated by complementing the distance between the ground elements 9 using GPS (Global Positioning System) information, a rotation number pulse signal of a tire, a rotation pulse signal of a drive motor, or the like. The own vehicle position information may be transmitted from a monitoring center, a command center, or the like by a radio signal.

The switching control unit 51 performs control for switching the steering method of the steering link mechanisms 26 between active control steering and passive control steering on the basis of the input of at least one of the point signal and the own vehicle position information.

The active control drive mechanism 52 is a mechanism which performs active control steering of the steering link mechanisms 26 by the actuator 13 on the basis of the point signal, the own vehicle position information, and information from the displacement sensors 48.

Specifically, the active control drive mechanism 52 has a steering amount calculation unit 54 and an actuator 13. The steering amount calculation unit 54 has a feedforward calculation unit 55 to which the point signal and the own vehicle position information are input, and a feedback calculation unit 56 to which the information of the displacement sensors 48 is input.

The feedforward calculation unit 55 is a calculation unit which determines the steering amounts of the steering link mechanisms 26 on the basis of the input of the point signal and the own vehicle position information. The feedforward calculation unit 55 specifies the position of the track-based vehicle 3 by at least one of the point signal and the own vehicle position information described above, determines whether the track-based vehicle 3 travels on a linear track or a curved track in advance on the basis of track information at this position, and operates the steering link mechanisms 26 so as to follow the track.

A track on which the track-based vehicle 3 is traveling can be acquired by the point signal and the own vehicle position information. The feedforward calculation unit 55 specifies the own vehicle position with respect to the stored track line shape information, and performs steering control of the steering link mechanisms 26 such that the track-based vehicle 3 travels along the track line shape ahead thereof. Of course, the track-based vehicle 3 is controlled so as to travel along the center of the track 2.

The feedback calculation unit 56 is a calculation unit which determines the steering amounts of the steering link mechanisms 26 on the basis of the input from the displacement sensor 48. The feedback calculation unit 56 measures left and right displacement of the vehicle by the inputs of the displacement sensors 48, and operates the steering link mechanism 26 such that the left and right gaps are constant at all times.

The calculation result of the steering amount calculation unit 54 is input to the actuator 13, and the actuator 13 is driven.

Next, a control procedure will be described referring to the flowchart of FIG. 9. As shown in FIG. 1, the flowchart describes a case where the track-based vehicle 3 which leaves the station A by passive control steering is switched to active control steering in the inter-station high-speed section H and then travels to the station B.

The switching point between the active control steering and the passive control steering is a point at a predetermined distance from a station, and is appropriately set according to the specification of the transportation system 1.

First, the switching control unit 51 measures the distance from the station A as a reference to the track-based vehicle 3 on the basis of distance information (S1), and determines whether or not the distance between the track-based vehicle 3 and the station A is equal to or greater than A1 which is the distance from the station A until the active control steering is ON (S2). That is, when the distance A1 is not reached, the passive control steering is continued, and when the distance A1 is reached, that is, when it is determined that the track-based vehicle 3 is traveling on an active control steering section (inter-station high-speed section), the active control steering is ON by the switching control unit 51 (S3), and the steering link mechanisms 26 are controlled in accordance with an active control steering flow (S4).

During the active control steering, it is determined whether or not the distance between the track-based vehicle 3 and the station A is equal to or greater than A2 which is the distance from the station A until the active control steering is OFF (S5). When the distance A2 is reached, that is, when it is determined that the active control steering section ends, the active control steering is OFF by the switching control unit 51 (S6), and is switched to the passive control steering.

Next, the active control steering flow will be described.

In the active control steering flow, first, a control pattern is calculated on the basis of track information between the station A and the station B included in the point signal, vehicle weight information, and vehicle operation information (S8). Next, feedforward control is performed by the feedforward calculation unit 55 on the basis of the calculation result of the control pattern (S9).

In the active control steering flow, feedback control is also performed using the feedback calculation unit 56 (S10). The feedback control measures left and right displacement of the vehicle on the basis of the information of the displacement sensors 48 (S11), determines whether or not left and right displacement is greater than a dead zone value of sensing of the displacement sensors 48 (S12), and when the left and right displacement is greater than the dead zone value of sensing, performs correction of the steering link mechanisms 26.

According to the foregoing embodiment, since the track-based vehicle 3 travels on the track 2 without being guided by the main guide rails 5 in the inter-station high-speed section H of the entire track 2, it is possible to allow the track-based vehicle 3 to travel without depending on the state of the guide rails 5. Accordingly, of the entire track 2 on which the track-based vehicle 3 travels, a section in which the track-based vehicle 3 comes into contact with the main guide rails 7 and vibrates left and right is shortened, thereby improving riding quality.

The travel steering of the track-based vehicle 3 is performed by steering the direction of the running tires 12 by the active control drive mechanism without using the guide rails 5. Accordingly, since it is possible to allow the track-based vehicle 3 to travel without depending on the state of the guide rails 5, the track-based vehicle 3 does not vibrate left and right, and it is possible to provide the transportation system 1 with excellent riding quality.

Since the track-based vehicle 3 is allowed to travel without using the guide rails 5, the precision of the guide rail 5 is not required as high as the current condition. Accordingly, since the time necessary for adjusting the guide rails 5 can be shortened, and the maintenance of the guide rails 5 requires less time, it is possible to significantly reduce initial installation cost or maintenance cost.

Since the guide wheels 19 are not in contact with the guide rails 5, irregularity (step or deflection) of the guide rails 5 due to deviation of the guide rails 5 caused by contact does not occur, rail damage is reduced, and maintenance cost can be reduced.

Since there is no case where the guide wheels 19 and the guide rails 5 come into contact with each other in the high-speed traveling state, it is not necessary to take into consideration abrasion of the guide wheels 19 at all. Furthermore, since it is not necessary to configure the guide wheels 19 to have high durability, it is possible to significantly reduce cost.

Since a load is not applied to the bearing relation for use in a shaft or the like which supports the guide wheels 19, as well as the guide wheels 19, it is possible to simplify the maintenance content of the travel devices 11, to extend the maintenance section, and to significantly reduce maintenance cost.

Since the guide wheels 19 are not in contact with the guide rails 5, contact sound of the guide wheels 19 and the guide rails 5 is eliminated, and it becomes possible to achieve noise reduction.

Since the transportation system of the invention can be operated along with the existing track-based vehicle 3, and the rail spacing of the main guide rails 7 substantially has the same dimension as the rail spacing in the existing transportation system, it is possible to easily perform the introduction into the existing system.

The junction guide rails 8 are U-shaped rails in the station & junction section ST, whereby it is possible to guide the track-based vehicle 3 only by the junction guide rails 8.

Second Embodiment

A second embodiment is a modification example of the first embodiment. The same elements as those in the first embodiment are represented by the same reference numerals, and description thereof will not be repeated.

Figure 10:
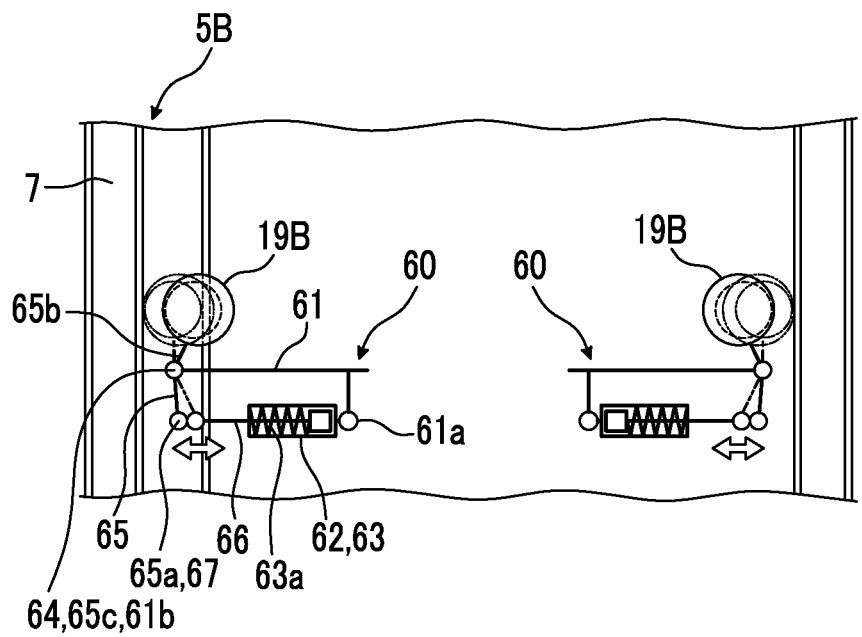
FIG. 10 is a plan view illustrating a mechanism of guide rails and guide wheels according to a second embodiment.
Figure 11:
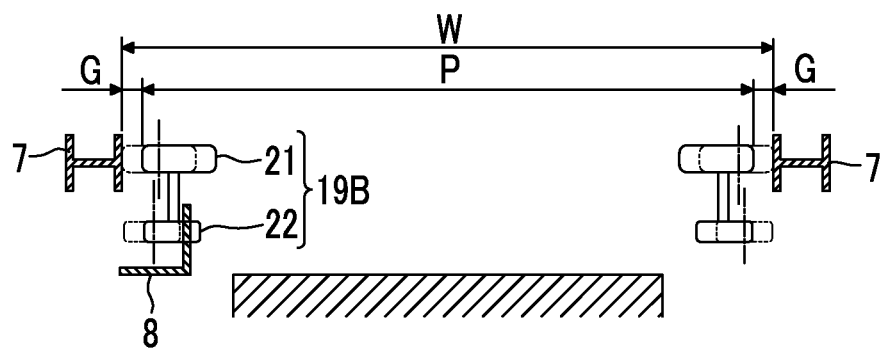
FIG. 11 is a schematic view illustrating the details of guide rails and guide wheels according to the second embodiment.

FIG. 10 is a plan view illustrating a mechanism of guide rails 5B and guide wheels 19B of this embodiment. FIG. 11 is a sectional view corresponding to FIG. 7 of the first embodiment. As shown in FIG. 10, the guide wheels 19B of this embodiment are expandable, and the outer width P can be changed in the inter-station high-speed section H and the station & junction section ST.

The guide wheels 19B of this embodiment are attached to expandable mechanisms 60. Each of the expandable mechanisms 60 has an L-shaped base frame 61 which is fixed at a predetermined position of the support frame 24 (see FIG. 3), a hydraulic cylinder 62 which is attached to one end 61a of the base frame 61, and a lever 65 which is rotatably attached to the other end 61b of the base frame 61 through a connecting pin 64.

The lever 65 is a substantially rod-shaped member which is bent in a bent portion 65c, and the bent portion 65c is attached to the other end 61b of the base frame 61 by the connecting pin 64. The hydraulic cylinder 62 has a body portion 63 and a movable rod 66, the end portion of the body portion 63 is attached to one end 61a of the base frame 61, and the end portion of the movable rod 66 is attached to one end 65a of the lever 65 through a connecting pin 67. A spring 63a is embedded in the body portion 63 of the hydraulic cylinder 62, and the hydraulic cylinder 62 is constantly in an expanded state by the spring 63a.

The other end 65b of the lever 65 supports the guide wheel 19B rotatably.

In the above-described expandable mechanism 60, the lever 65 and the hydraulic cylinder 62 cooperate to reduce the outer width P of the main guide wheels 21. For example, the outer width P of the main guide wheels 21 can be extended and reduced by 30 mm to 50 mm per side.

Next, the detailed dimension of the guide rails of this embodiment will be described referring to FIG. 11.

As in the first embodiment, the rail spacing W of this embodiment can be, for example, 2,900 mm.

The junction guide rails 8 substantially have the same shape as the existing junction guide rails 8. That is, the junction guide rails 8 of this embodiment are rails having an L-shaped section, and a part corresponding to the sub-guide wall 72 (see FIG. 7) of the first embodiment is not provided.

Next, a control method for the expandable mechanism of the guide wheel 19B of this embodiment will be described.

The expandable mechanism 60 is controlled at the same timing as the active control steering and the passive control steering by the switching control unit 51. Specifically, in a passive control steering section (station & junction section ST), the expandable mechanism 60 makes the outer width P of the main guide wheels 21 be, for example, 2,900 mm. That is, the outer width P of the main guide wheels 21 is set to the dimension such that the main guide wheels 21 are guided by the main guide rails 7.

In an active control steering section (inter-station high-speed section H), the expandable mechanism 60 reduces the outer width P of the main guide wheels 21 such that a predetermined gap G is generated between the main guide wheels 21 and the main guide rails 7. For example, setting is made such that the gap G of 30 mm to 50 mm is generated between the main guide wheels 21 and the main guide rails 7.

Of the expandable operation, a contraction operation is simultaneously performed left and right, an expansion operation expands from a side on which the spacing is wide at the sight of the left and right displacement by the displacement sensors 48, the operation speed is appropriately controlled, and impact is not generated.

According to the above-described embodiment, since the junction guide rails 8 are provided, and the existing guide rails can be used as the guide rails 5, it is possible to operate and introduce the existing transportation system.

Third Embodiment

A third embodiment is a modification example of the first embodiment. The same elements as those in the first embodiment are represented by the same reference numerals, and description thereof will not be repeated.

A transportation system 1C of this embodiment uses a track-based vehicle 3C, in which the outer width P of the main guide wheels 21 is changed, compared to the track-based vehicle 3 of the first embodiment. A rail spacing W1 in the station & junction section ST (passive control steering section) is different from a rail spacing W2 in the inter-station high-speed section H (active control steering section). Hereinafter, description will be provided specifically referring to the drawings.

Figure 12:
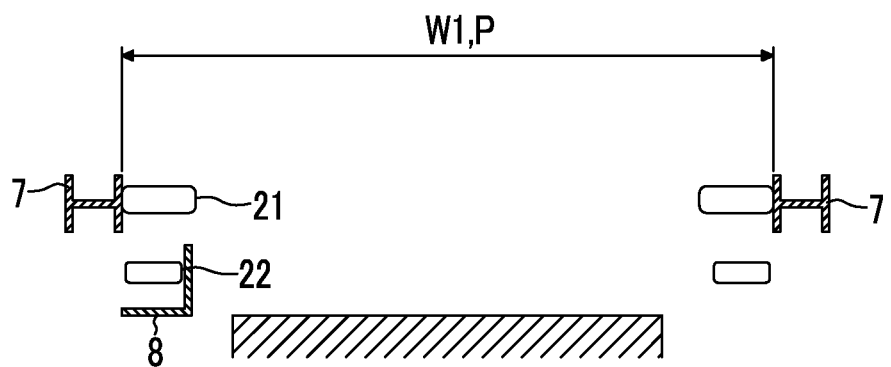
FIG. 12 is a schematic view illustrating the details of guide rails and guide wheels in a station & junction section according to a third embodiment.
Figure 13:
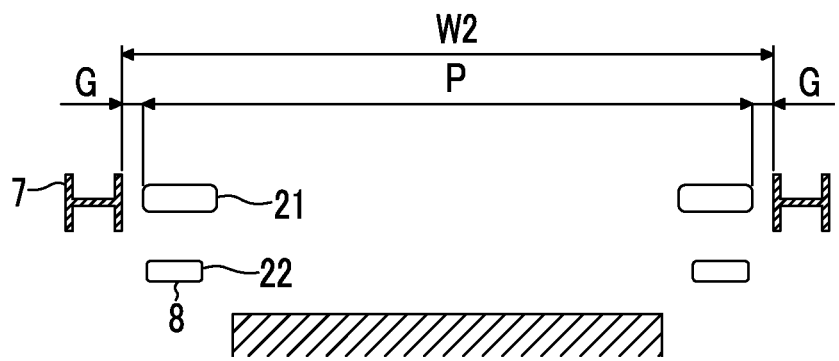
FIG. 13 is a schematic view illustrating the details of guide rails and guide wheels in an inter-station high-speed section according to the third embodiment.

FIGS. 12 and 13 are diagrams illustrating the detailed dimension of guide rails and guide wheels of this embodiment. Of these, FIG. 12 shows the detailed dimension of the guide rails and the guide wheels in the station & junction section ST (passive control steering section), and FIG. 13 shows the outline of the guide rails and the guide wheels in the inter-station high-speed section H (active control steering section).

The outer width P of the main guide wheels 21 of the track-based vehicle 3C of this embodiment is, for example, 2,900 mm, and other configurations are the same as those of the track-based vehicle 3 of this first embodiment. That is, the outer width P of the track-based vehicle 3C of this embodiment can be the same dimension as the existing track-based vehicle. The rail spacing W1 in the station & junction section ST is substantially the same as the outer width P of the main guide wheels. That is, in the station & junction section ST, the track-based vehicle 3C is guided by the main guide rails 7.

As shown in FIG. 13, the rail spacing W2 in the inter-station high-speed section H of this embodiment is wider than the rail spacing W1 in the station & junction section ST by a predetermined dimension. For example, the rail spacing W2 in the inter-station high-speed section H is 2940 mm to 3000 mm. That is, in the inter-station high-speed section H in which the active control steering is performed, a predetermined gap G (for example, 30 mm to 50 mm) is generated between the main guide wheels 21 and the main guide rails 7.

In a transition section of the station & junction section ST and the inter-station high-speed section H, the guide rails 5 are bonded obliquely so as to change gradually.

A mechanism relating to the active control steering, such as the active control drive mechanism 52 of the track-based vehicle 3C, is the same as that in the track-based vehicle 3 of the first embodiment.

According to this embodiment, if the rail width of the main guide rails 7 is changed between the station & junction section ST and the inter-station high-speed section H, in the station & junction section ST, one-sided guidance only by the junction guide wheels 22 is eliminated, whereby durability of the junction guide wheels 22 is improved.

In regard to the track-based vehicle 3C, since it should suffice that the active control drive mechanism 52, such as an actuator, is just added to the existing track-based vehicle, it is possible to easily carry out the improvement of the track-based vehicle.

Note that the technical scope of the invention is not limited to the foregoing embodiments, and various alterations may be made within the scope without departing from the spirit of the invention. For example, in the foregoing embodiments, although the spacing between the main guide rails 7 and the main guide wheels 21 is measured by the displacement sensors 48 provided in both lateral portions of the track-based vehicle 3 during the active control steering, the invention is not limited thereto.

Figure 14:
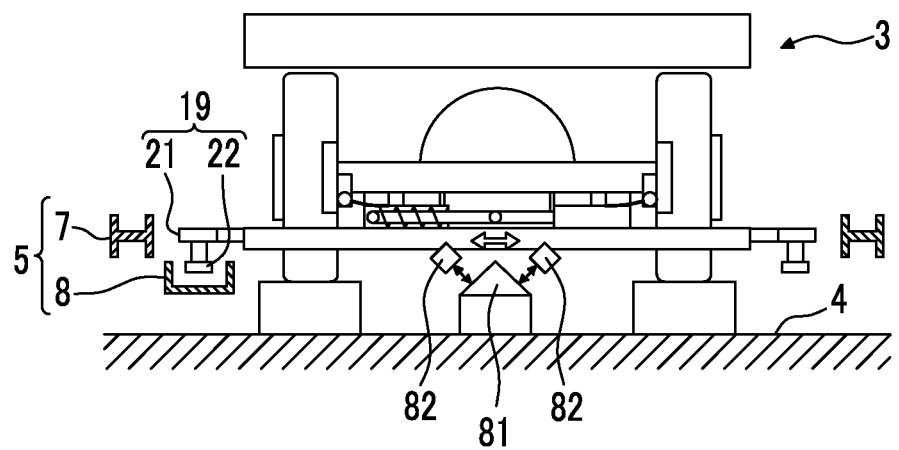
FIG. 14 is a front view illustrating a travel device and a center guide according to another embodiment.

For example, as shown in FIG. 14, a configuration in which a center guide 81 is provided newly on the traveling road surface 4, and a displacement sensor 82 of the track-based vehicle 3 is provided toward the center guide 81 may be made.

In this way, the center guide 81 is provided newly, that is, a sensing target separated from the guide rails 5 is provided, whereby it is possible to carry out accurate position control without depending on the state of the guide rails 5.

INDUSTRIAL APPLICABILITY

The invention relates to a transportation system including a vehicle, and a track having a traveling road surface on which the vehicle travels and guide parts which extend on both sides in a width direction of the traveling road surface, in which the track has a first section in which the vehicle is guided by the guide part and travels on the track, and a second section in which the vehicle travels on the track by the steering of the vehicle.

According to the invention, it is possible to provide a transportation system with excellent riding quality without causing left/right vibration of a vehicle.

REFERENCE SIGNS LIST

1: transportation system
2: track
3: track-based vehicle
4: traveling road surface
5: guide rail (guide part)
7: main guide rail
8: junction guide rail (auxiliary guide part)
10: vehicle body
11: travel device
12: running tire (running wheel)
13: actuator
15: vehicle body underframe
16: vehicle body
19: guide wheel
20: passive control guide mechanism
21: main guide wheel
22: junction guide wheel (auxiliary guided part)
26: steering link mechanism (steering mechanism)
48: displacement sensor
51: switching control unit
52: active control drive mechanism
60: expandable mechanism H: inter-station high-speed section (second section)
ST: station & junction section (first section)

The invention claimed is:

1. A transportation system comprising:
a vehicle; and
a track having a traveling road surface on which the vehicle travels and guide parts which extend on both sides in a width direction of the traveling road surface,
wherein the track has
a first section in which the vehicle is guided by the guide parts and travels on the track, and
a second section in which the vehicle travels on the track by steering of the vehicle,
wherein the vehicle comprises:
a vehicle body,
running wheels which are attached to a lower portion of the vehicle body,
a steering mechanism which is configured to steer a direction of the running wheels with respect to the vehicle body,
a drive mechanism which includes an actuator and is configured to operate the steering mechanism by driving of the actuator to steer the direction of the running wheels, and
a guide mechanism which includes guided parts positioned on both sides in a width direction of the vehicle body and guided by the guide parts, and is configured to cause the steering mechanism to steer the direction of the running wheels in accordance with positions of the guided parts in the width direction of the vehicle body,
wherein the guide mechanism includes an auxiliary guided part which allows the steering mechanism to adjust the direction of the running wheels in accordance with the positions of the guided parts in the width direction of the vehicle body, and
wherein the track is provided such that the guide parts are at a distance equal to or greater than a preset gap from the guided parts of the vehicle, the track comprises an auxiliary guide part which guides the auxiliary guided part, and a gap between the auxiliary guide part and the auxiliary guided part is smaller than the preset gap between the guide parts and the guided parts.

2. The transportation system according to claim 1, further comprising:
a steering control switching control unit which is configured to control the driving of the drive mechanism in the second section, which is set in advance in the track and in which the steering mechanism is controlled by the drive mechanism, and is configured to stop the driving by the drive mechanism in the first section, which is set in advance in the track and in which the steering mechanism is controlled by the guide mechanism.

3. The transportation system according to claim 2, wherein a distance between the guided parts is changeable.

4. The transportation system according to claim 3, wherein the distance between the guide parts differs in the first section and the second section.

5. The transportation system according to claim 2, wherein the distance between the guide parts differs in the first section and the second section.

6. The transportation system according to claim 1, wherein a distance between the guided parts is changeable.

7. The transportation system according to claim 6, wherein the distance between the guide parts differs in the first section and the second section.

8. The transportation system according to claim 1, wherein the distance between the guide parts differs in the first section and the second section.

9. The transportation system according to claim 1, wherein the distance between the guide parts is the same in the first section and the second section.

* * * * *